Figure 1:
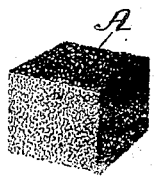

No. 713,581. Patented Nov. 11, 1902.
H. D. WINTON.
CEREAL FOOD.
(Application filed Dec. 21, 1901.)

(No Model.)

Witnesses: Inventor

UNITED STATES PATENT OFFICE.

HENRY D. WINTON, OF WELLESLEY HILLS, MASSACHUSETTS, ASSIGNOR OF ONE-HALF TO FRANCIS C. HERSEY, OF WELLESLEY HILLS, MASSACHUSETTS.

CEREAL FOOD.

SPECIFICATION forming part of Letters Patent No. 713,581, dated November 11, 1902.

Application filed December 21, 1901. Serial No. 86,750. (No specimens.)

*To all whom it may concern:*

Be it known that I, HENRY D. WINTON, a citizen of the United States, residing at Wellesley Hills, in the county of Norfolk and State of Massachusetts, have invented a new and useful Improvement in Food Preparations, of which the following is a full, clear, and exact description, reference being had to the accompanying drawings, forming a part of this specification, in explaining its nature.

My invention relates to a new article of food consisting of compressed cubes or blocks of cereals, which are manufactured by coating the granulated or crushed natural or uncooked or substantially uncooked cereals with a syrup of sugar or its equivalent, compressing the cereal into small cubes or blocks while the syrup is still moist, and then thoroughly drying the blocks, so that they are cemented into solid form to enable them to be packed closely together in boxes or cartons, the purpose being to treat any crushed cereal in such a manner as to convert it into a form to protect it against deterioration and to admit of so packing it as to best preserve it in a wholesome, cleanly, palatable, attractive, and economical form.

It is well known that all forms of cereal foods deteriorate in the granulated and flour forms more or less rapidly—I mean, for instance, the various forms of oats, wheat, and other cereal foods that are put up for public consumption in the form of meal and flour. These foods mold, sour, and become wormy, making them often unfit for consumption. Various attempts have been made to remedy these objections—such, for instance, as sterilizing the crushed grains by various methods of heat treatment, partial coating of the granules, chemically treating them, packing them in boxes, freeing their gluten to form the crushed cereals into cakes or packages, &c.; but, so far as I am informed, none of these methods have been practically efficient. The crushed grains when treated for sterilization fail to remain in a sterilized condition, and when the loose granules are exposed bacteria develop and germinate in the granules, putrefaction sets in, and the crushed cereal deteriorates more or less rapidly, depending upon the climatic conditions and the surrounding conditions which favor a deposit of bacteria from the outside or favor the growth of those which may not have been destroyed in the sterilization. Partial cooking and chemical treatment changes the condition of the cereal, so that its original flavor and appearance are affected and so that it is non-marketable. By packing the well-cured cereal in boxes or packages the deterioration is, of course, materially retarded. This protection is most general at the present time; but when the packages are opened deterioration sets in. I have found some of the very best cured and highest grades of cereal breakfast foods put up in close boxes which have become sour and which have developed larvæ, so as to have become entirely unfit for consumption in a very short time after being opened. When attempts have been made to form a crushed cereal into packages or cakes by freeing the gluten or soluble starch contained in it and treating it so as to hold it in that form the character of the cereal is changed. The package or cake is not sufficiently hard to stand handling without breakage, and the original appearance is so changed as to make it unattractive as an article of food.

By means of my invention the cereal is put in an entirely new and novel form, so as to preserve its purity for the longest possible time, holding it in a cleanly, wholesome, palatable, and attractive form and in no way affecting its original nutritious quality, but, on the other hand, treating it in a manner to preserve its original nutritive quality and its appearance. I accomplish the manufacture of this article of food by means of a process having several stages, which process I have set forth in a separate application, Serial No. 86,749, filed simultaneously herewith, the present application being confined to my invention as an article of manufacture resulting from the process therein described.

Figure 2:
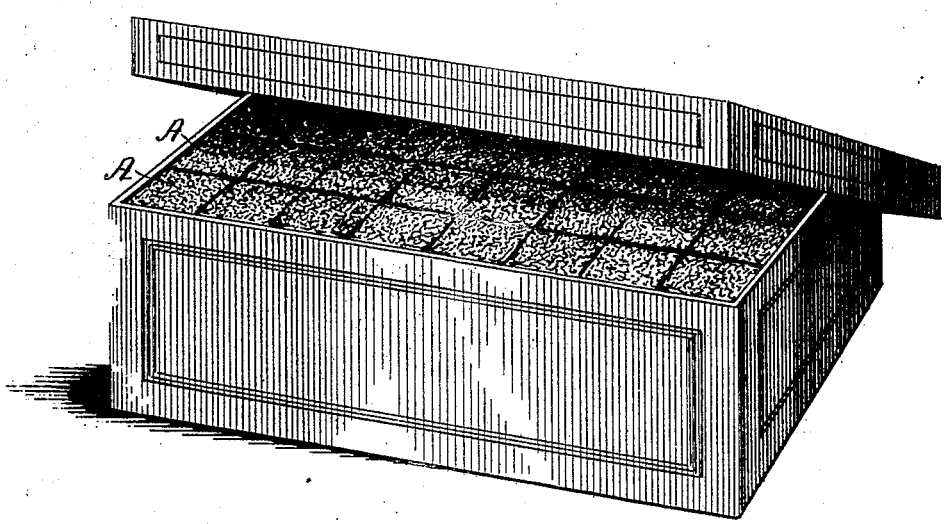

Referring to the drawings accompanying this specification, Figure 1 represents a cube or block of cereal food. Fig. 2 represents a package or box of these cubes with the cover partially removed.

In Fig. 1, A represents a cube or block of crushed oatmeal or other cereal of ordinary or medium grinding which has been formed into a cube, say, about three-fourths of an inch square, or the size of ordinary commercial cube sugar. This has been formed by taking the crushed, uncooked, or substantially uncooked cereal, previously cleaned, and mixing with it a small amount of syrup composed of white sugar dissolved in about an equal weight of water to the gage of about 30° Baumé scale, so that it is just sticky enough to hold the granules together when they are pressed into shape in a mold and in a quantity to just coat each granule of the mass with a thin film. About two ounces of this thin sugar-syrup is used to each eight ounces of the oatmeal or other crushed cereal. Any adhesive and preserving fluid having the characteristics of the sugar-syrup may be substituted therefor. The cubes are then dried in an oven until every particle of moisture is extracted, when they will be found to hold their shape by the cementing action of the sugar in hard firm cubes that will withstand more or less rough handling without breakage and which when the syrup is properly proportioned and mixed will leave the crushed cereal after it is dried with a perfectly natural appearance—that is, the film is not perceptible or has no gloss, but the granules have the appearance of being uncoated. The crushed grain so treated will, however, upon being put into water for the purpose of cooking immediately fall to pieces or assume the condition that it would have had had it not been pressed into the cubes, as described. There are some cereals which have been partially treated by heat, so that they are not entirely uncooked, but for the purposes of the invention or discovery they may be considered substantially uncooked foods.

The valuable features of this method of treatment are that the cereal can be taken in a fresh ground or crushed condition, and having been treated at once with the syrup, as above described, each granule becomes itself protected with an imperceptible covering which not only seals the granule up, but acts upon it as an antiseptic, this feature being still more effective when a small amount of salt is added to the syrup. Then by compressing these granules into a solid block they are again protected by each other, and finally when the compacted cereal is subjected to the action of heat until the moisture is extracted each granule is surrounded with a slight antiseptic coating, and each granule is surrounded by its neighbors, thereby sealing it up and protecting the whole mass in a block in a most thorough manner to retard the growth of germs and at the same time by the antiseptic action of the coating putrefaction is prevented.

I find that the amount of syrup solution necessary to form the hard block is so small that its taste is hardly perceptible in the cooked food. It barely gives the food the slightest flavor, not as though it had been sweetened, but as though it were a sweet-flavored growth. I also find that the crushed cereal so treated maintains a clear, bright, wholesome appearance, the granules not being crushed or broken down, because the syrup does not perceptibly penetrate and soften them, and the crushed cereal appears granular and not mushy or unattractive in appearance.

Fig. 2 represents a box B of these cubes A, packed closely to form a solid mass as I prepare them for market. By packing them in this way they are still further protected and will maintain their purity much longer and can be handled with more economy than in the flour form, as there is no breakage by spilling from broken packages, and, further, as a definite number of these cubes form a ration or portion they can be dealt out for cooking with intelligence. I find that three of these cubes, as above described, when cooked produce what might be called a "portion" or "saucerful," such as would ordinarily be served to an individual.

I have in this article a cereal food which is possessed of all the qualities set forth in the foregoing statement of my invention.

It will be understood that the cereals which are used are the ordinary cereals of the market as they are now prepared and that the purpose of this invention is not to change the character of the cereals in any manner that shall change their shape or shall give them any different quality or flavor than they now possess, as it is not desirable that these qualities should in any way be modified by the invention, the object of which is to provide a product which shall while preserving all these qualities also insure that they be maintained for a much longer period than is now possible with the present methods of marketing them. Consequently the shape of the granules of the cereals is not changed in the manufacture of the product by pressure. Neither is enough sugar added to the product to sweeten the food; but there is employed only enough of the binding composition to first coat each granule and then to unite the coated granules for the purpose, first, of excluding atmospheric influences, and, second, for the further purpose of uniting together the weatherproofed granules in a shape that shall insure further protection as well as prevent waste, and the pressure that is used for so uniting the coated atoms is not of a destructive character, does not tend to fracture or rupture the coatings of the individual granules or to crush into each other the granules of the compressed block, but simply serves to cause the individual coatings of the granules throughout the mass to be also united with each other, whereby they tend to hold the granules together and also to prevent a further barrier to the increase of destructive atmospheric influences.

Having thus fully described my invention, I claim and desire to secure by Letters Patent—

1. The herein-described food preparation consisting of a comminuted uncooked cereal of the kind and character commonly employed as a food product, the granules of which are protected from atmospheric and other destructive influences by being covered with an imperceptible coating of sugar, forming a thin, transparent, unglazed, protective film about each granule and whereby the life of the cereal is continued without modifying in any way its original and common properties or the manner of its use.

2. The herein-described food preparation consisting of lightly-compressed blocks of a comminuted uncooked cereal of the kind and character commonly employed as a food product, the granules of which are protected from atmospheric and other destructive influences by being covered with an imperceptible coating of sugar, forming a thin, transparent, unglazed, protective film about each granule and also serving to cause the granules to adhere together and hold them so combined and to thus further protect them, and whereby the life of the cereal is continued without modifying in any way its original and common properties or the manner of its use and waste thereof avoided.

3. As a new article of manufacture, the herein-described food product consisting of a lightly-compressed body of comminuted, uncooked cereal of the kind and character commonly employed as a food product, the granules of which are individually protected from atmospheric and other destructive influences by an imperceptible, preserving, uniting and soluble film which is adhesive when fluid and hot, and hard when dry and at atmospheric temperature; whereby the granules are fixed in place and protected individually and collectively by the said uniting and preserving film without modifying in any way the original and common properties of the cereal or the manner of its use.

HENRY D. WINTON.

In presence of—
J. M. DOLAN,
J. E. R. HAYES.